(12) United States Patent  
Balolia

(10) Patent No.: US 7,823,612 B2  
(45) Date of Patent: Nov. 2, 2010

(54) SYSTEMS AND METHODS FOR MEASURING HEIGHT OF JOINTER INFEED SURFACE

(75) Inventor: Shiraz Balolia, Bellingham, WA (US)

(73) Assignee: Grizzly Industrial, Inc., Bellingham, WA (US)

( * ) Notice: Subject to any disclaimer, the term of this patent is extended or adjusted under 35 U.S.C. 154(b) by 545 days.

(21) Appl. No.: 11/890,808

(22) Filed: Aug. 7, 2007

(65) Prior Publication Data

US 2008/0229596 A1     Sep. 25, 2008

Related U.S. Application Data

(63) Continuation-in-part of application No. 11/713,406, filed on Mar. 1, 2007.

(51) Int. Cl.
*B27C 1/00* (2006.01)
(52) U.S. Cl. .................................. 144/114.1; 144/361
(58) Field of Classification Search ............. 144/114.1, 144/117.1, 253.8, 129, 253.2, 135.2, 253.5, 144/253.6, 253.9; 33/628, 630, 640, 832, 33/833
See application file for complete search history.

(56) References Cited

U.S. PATENT DOCUMENTS

| | | | | | |
|---|---|---|---|---|---|
| 2,729,923 | A | * | 1/1956 | Durst | 451/421 |
| 2,804,107 | A | * | 8/1957 | Taylor | 144/129 |
| 2,960,125 | A | * | 11/1960 | Erickson et al. | 144/129 |
| 5,979,521 | A |   | 11/1999 | Garcia | |
| 6,058,993 | A | * | 5/2000 | Albert et al. | 144/382 |
| 6,494,239 | B1 | * | 12/2002 | Liao | 144/129 |
| 6,510,879 | B1 | * | 1/2003 | Chuang | 144/130 |
| 6,532,679 | B2 | * | 3/2003 | Cole | 33/640 |
| 6,533,642 | B1 | * | 3/2003 | Dyer | 451/8 |
| 6,666,242 | B1 | * | 12/2003 | Liao | 144/130 |
| 7,231,858 | B2 | * | 6/2007 | Oberheim | 83/477.2 |
| 2004/0144446 | A1 | * | 7/2004 | Wixey et al. | 144/114.1 |

FOREIGN PATENT DOCUMENTS

DE     199 17 537     12/2000
EP     0 924 027     6/1999

OTHER PUBLICATIONS

Wixey, US 2005/005468 A1, Jan. 13, 2005, USPTO.
Gilbert, US 2003/205293 A1, Nov. 6, 2003, USPTO.
Karrip, US 2003/164052 A1, Sep. 4, 2003, USPTO.

* cited by examiner

*Primary Examiner*—Dana Ross
*Assistant Examiner*—Jennifer Chiang
(74) *Attorney, Agent, or Firm*—Michael R. Schacht; Schacht Law Office, Inc.

(57) ABSTRACT

A jointer system comprises a blade assembly, a base, an infeed table, and a measurement system. The base supports the blade assembly for rotation about a blade axis. The infeed table is movably supported by the base. The measurement system comprises a stop member, a gauge assembly, and a display assembly. The stop member defines a stop plane. The gauge assembly comprises a gauge, a pin member supported by the gauge such that the pin member is in contact with the stop member, and a display assembly. As the infeed table moves relative to the base, the gauge assembly generates a measurement signal indicative of vertical displacement of the infeed table relative to the base. The display assembly generates a display image based on the measurement signal.

6 Claims, 5 Drawing Sheets

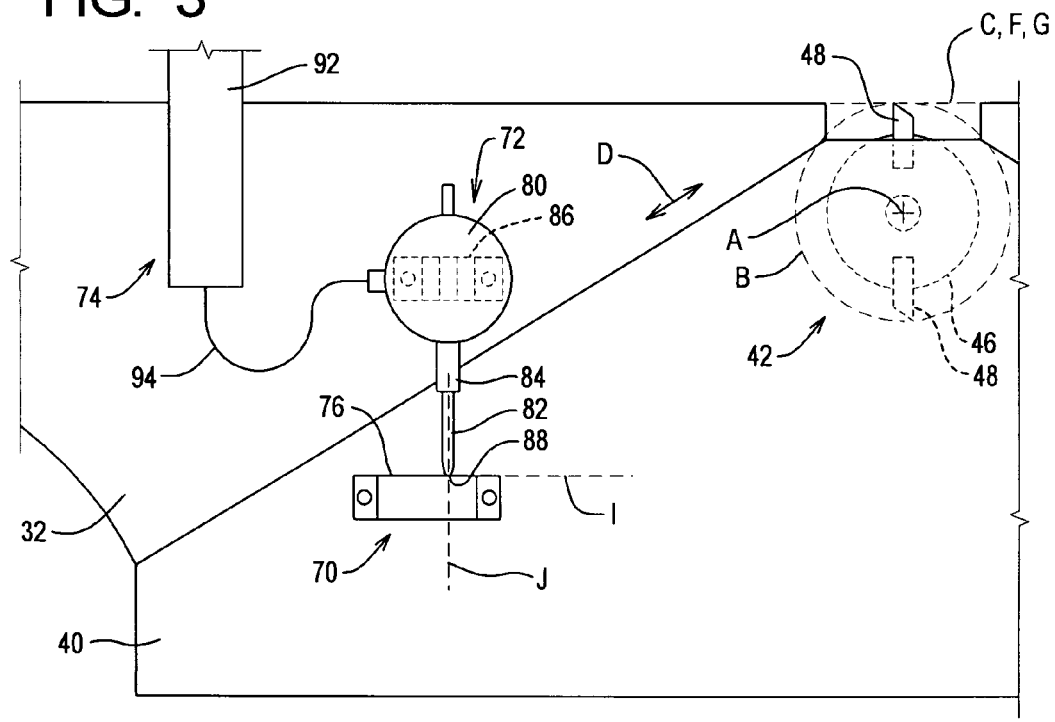
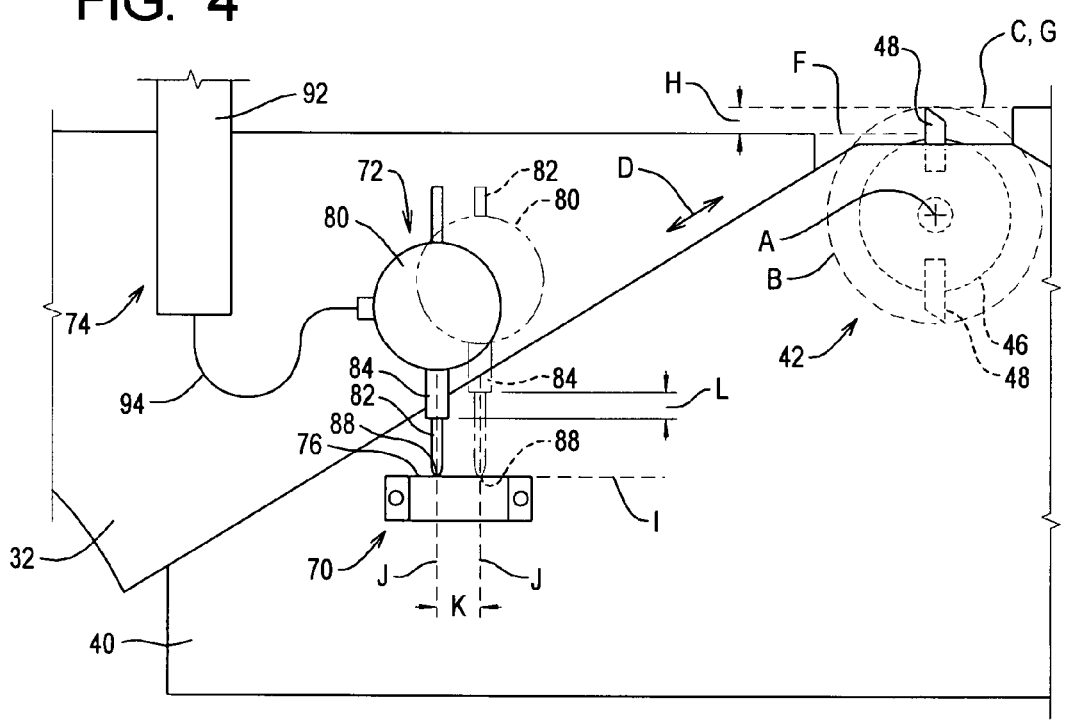

SYSTEMS AND METHODS FOR MEASURING HEIGHT OF JOINTER INFEED SURFACE

RELATED APPLICATIONS

This application is a continuation-in-part of U.S. patent application Ser. No. 11/713,406 filed Mar. 1, 2007, the contents of which are incorporated herein by reference.

TECHNICAL FIELD

The present invention relates to jointer tables and, in particular, to systems and methods for measuring a height of a jointer table infeed surface relative to a reference plane.

BACKGROUND OF THE INVENTION

A wooden board used in woodworking projects is typically a rectangular solid defining a pair of edge surfaces, a pair of face surfaces, and a pair of end surfaces. Ideally, the edge surfaces, face surfaces, and end surfaces of wooden boards used in woodworking projects are all completely flat, smooth, and parallel to each other.

However, the surface characteristics of raw boards used in woodworking typically vary based on numerous factors such as the type of wood, the growing conditions of the tree from which the board was obtained, the process of milling the board from the log, and changes in environment that affect the moisture content of the board after the milling process.

Accordingly, if the face surfaces of a raw board are not planar (e.g., cupped or bowed), the face surfaces are also milled such that they are substantially planar. In addition, before a typical raw board can be used in a woodworking product, the edge and end surfaces of the raw board are typically milled such that they are squared relative to the face surfaces thereof and smoothed for gluing and/or finishing.

The process of milling of a raw board to obtain a squared board thus typically involves milling of the face surfaces such that the face surfaces are substantially flat and parallel to each other and then milling of the edge surfaces such that they are smooth and perpendicular to the face surfaces.

Using modern woodworking machinery, the process off milling a raw board to obtain a squared board typically comprises the step of milling a first face surface flat using a jointer or planar, milling a second face surface flat and parallel to the first face surface using a planar, and milling the side edges smooth and square using the jointer. The end edges are typically cut to length using a cross-cut saw of some type (radial arm saw, table saw).

The present invention relates to jointers used during the process of milling a raw board to obtain a squared board. Jointers typically comprise a base supporting a blade assembly, an infeed table defining an infeed surface, and an outfeed table defining an outfeed surface. The infeed surface is substantially parallel to but not coplanar with the outfeed surface. The infeed table and outfeed table are supported by the base such that a cutting gap is defined between the infeed surface and outfeed surface. The base supports the blade assembly within the cutting gap. Typically, a jointer further comprises a fence that extends perpendicular to the infeed surface and the outfeed surface.

In use, a working surface on a board to be milled ("the workpiece") is placed on the infeed surface. The workpiece is then moved across the cutting gap such that the blade assembly removes a portion of the workpiece defining working surface. As the workpiece moves across the cutting gap, the workpiece is supported by the outfeed surface. The workpiece may be held against the fence as board is moved across the cutting gap.

One important factor in milling a workpiece using a jointer is the depth of the cut being made. The depth of cut is determined by a distance between an infeed plane defined by the infeed surface and a reference plane defined by the blade assembly. The reference plane is a plane that is parallel to the infeed plane and which is tangential to the uppermost part of a cutting cylinder defined by the cutting assembly. In general, the depth of cut should be maximized for a particular jointer and the characteristics a particular workpiece. The workpiece characteristics relevant to depth of cut include wood type, grain structure, moisture content, and dimensions of the working surface.

Most jointers therefore allow the depth of cut to be adjusted. The depth of cut is adjusted by moving the infeed table relative to the base. More specifically, the base supports a particular blade assembly such that the reference plane defined by the blade assembly is at a certain absolute location. The base supports the infeed table such that the infeed plane is parallel to the reference plane and the infeed plane may be moved up or down relative to the reference plane.

For a variety of reasons, however, the infeed table is not supported for simple up and down movement relative to the base. The term "simple movement" as used herein refers to the movement of the infeed table along a straight line path that is parallel to a vertical reference line that extends through the rotational axis of the cutter assembly. The terms "vertical" and "horizontal" as used herein are relative to the jointer, with the infeed plane and outfeed plane both being horizontal during normal use.

One problem with simple movement of the infeed table arises from the fact that a proximal edge of the infeed table defines a portion of the cutting gap. Simple movement of the infeed table causes the proximal edge to move laterally away from the blade assembly as the infeed table moves up relative to the base, thereby increasing the dimensions of the cutting gap. If the cutting gap becomes too large, the workpiece may not be milled properly to obtain a squared board. The proximal edge of the infeed table should thus be arranged as close as possible to the cutting assembly during milling to minimize the dimensions of the cutting gap.

The infeed table is thus typically supported for complex movement relative to the base. The term "complex movement" as used herein means that the infeed table moves such that the proximal edge of the infeed table moves along a path that is not parallel to the vertical reference line.

In a first type of jointers that will be referred to herein as sliding dovetail jointers, complex movement is obtained by forming complimentary angled support surfaces on the infeed table and the base. The support surfaces are angled with respect to the vertical reference line such that the proximal edge of the infeed table moves along a linear path towards and away from the vertical reference line as the infeed table moves relative to the base.

In a second type of jointers commonly referred to as parallelogram table jointers, the infeed table is supported by two arms that are pivotably connected to the base and to the infeed table. The arms allow the proximal edge of the infeed table to be moved along a non-linear (e.g., arcuate) path. The path of the infeed table proximal edge causes the proximal edge of the infeed table to move towards and away from the vertical reference line as the infeed table moves relative to the base.

In any system that yields complex movement as defined herein, the determination of depth of cut can be problematic. Typically, depth of cut is measured by a scale system comprising a scale formed on the base and a pointer connected to the infeed table. The scale comprises a series of lines, and the distance between the lines generally corresponds to increments of depth of cut. However, because of the small distances being measured, the lines must be so small that the relationship between the pointer and the lines on the scale can be difficult to see. In addition, such scale systems are inherently inaccurate below an incremental distance of approximately 1/32".

In addition, the need often arises to replace one blade assembly with another blade assembly. Different blade assemblies defined cutting cylinders having different diameters. Accordingly, the reference plane may be at different vertical levels relative to the base. Accordingly, conventional scale systems for measuring depth of cut in which the scale is attached to the base cannot easily be recalibrated for different reference planes established by different blade assemblies.

It should be noted that the outfeed table of a conventional jointer is typically adjustable in substantially the same manner as an infeed table. The use of an adjustable outfeed table allows the position of the outfeed table to be set to accommodate blade assemblies defining different reference planes. Typically, the outfeed table is adjusted such that the outfeed plane is substantially coplanar with the reference plane as defined by a particular blade assembly.

The need thus exists for accurate and reliable systems and methods for determining depth of cut for jointers.

SUMMARY OF THE INVENTION

The present invention may be embodied as a jointer system comprises a blade assembly, a base, an infeed table, and a measurement system. The base supports the blade assembly for rotation about a blade axis. The infeed table is movably supported by the base. The measurement system comprises a stop member, a gauge assembly, and a display assembly. The stop member defines a stop plane. The gauge assembly comprises a gauge, a pin member supported by the gauge such that the pin member is in contact with the stop member, and a display assembly. As the infeed table moves relative to the base, the gauge assembly generates a measurement signal indicative of vertical displacement of the infeed table relative to the base. The display assembly generates a display image based on the measurement signal.

The present invention may also be embodied as method of determining depth of cut of a jointer comprising a blade assembly, a base for supporting the blade assembly, and an infeed table movably supported by the base, comprising the following steps. A stop member is rigidly connected to one of the base and the infeed table. A rail is rigidly connected to the other of the base and the infeed table. A pin member is supported from a gauge. The gauge is supported relative to the rail such that movement of the infeed table relative to the base causes movement of gauge along a longitudinal axis of the rail. A measurement signal indicative of vertical displacement of the infeed table relative to the base is generated. A display image based on the measurement signal, where the display image displays data indicative of displacement of the infeed plane relative to the reference plane is generated.

BRIEF DESCRIPTION OF THE DRAWINGS

FIG. 3 is a rear elevation view illustrating the first example depth of cut measuring system in a first configuration;

FIG. 4 is a rear elevation view illustrating the first example depth of cut measuring system in a second configuration;

DETAILED DESCRIPTION OF THE INVENTION

Figure 1:
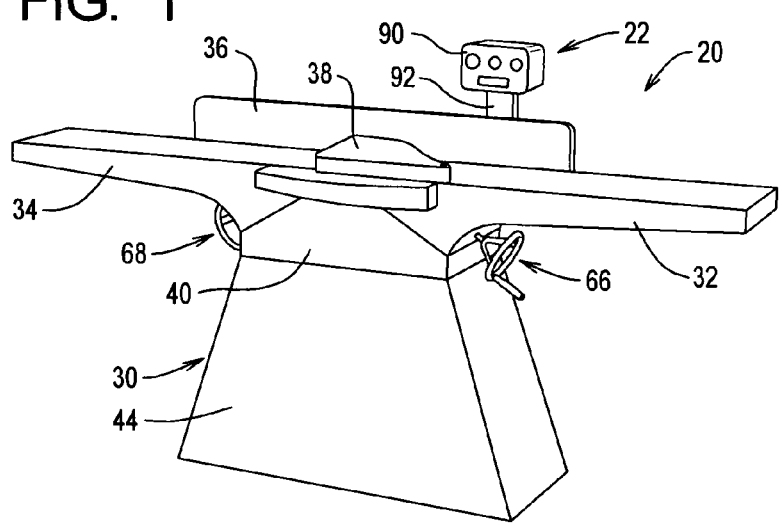
FIG. 1 is a perspective view of an example jointer employing a first example depth of cut measuring system of the present invention.

Referring initially to FIG. 1 of the drawing, depicted therein is an example jointer system 20 that may be used in combination with a first example depth of cut measuring system 22 constructed in accordance with, and embodying, the principle of the present invention. The jointer 20 is not per se part of the present invention, and will be described herein only to the extent necessary for a complete understanding of the first example depth of cut measuring system 22.

The example jointer 20 is a sliding dovetail style jointer, and the principles of the present invention will be described herein in the context of the example jointer 20. However, the example depth of cut measuring system 22 may be applied to other types of jointer systems such as a parallelogram table jointer.

The example dovetail style jointer 20 comprises a base assembly 30, an infeed table 32, an outfeed table 34, a fence 36, and a safety cover 38. The base assembly 30 comprises a base structure 40, a blade assembly 42, and a stand structure 44. The blade assembly 42 comprises a hub member 46 and one or more blade members 48 extending from the hub member 46.

The hub member 46 rotates about a blade axis A that is fixed relative to the base structure 40. As the hub member 46 rotates, the blade members 48 define a cutting cylinder B centered about the blade axis A. The cutting cylinder B in turn defines a reference plane C. The reference plane C is horizontal and tangential to the cutting cylinder B at the uppermost point thereof.

The infeed table 32 defines an infeed surface $S_i$ and a first table support surface 50. The outfeed table 34 defines an outfeed surface $S_o$ and a second table support surface 52. The base structure 40 defines first and second base support surfaces 54 and 56. The first base support surface 54 engages the first table support surface 50 to support the infeed table 32 for movement as shown by arrow D relative to the base structure 40. The second base support surface 56 engages the second table support surface 52 to support the outfeed table 34 for movement relative as shown by arrow E relative to the base structure 40.

The infeed table 32 defines an infeed proximal edge 60, and the outfeed table defines an outfeed proximal edge 62. The proximal edges 60 and 62 define a cutting gap 64. The blade assembly 42 is arranged such that the blades move at least partly within the cutting gap 64.

The base assembly 30 further comprises first and second handwheel assemblies 66 and 68. The handwheel assemblies 66 and 68 are conventionally configured to allow the user to displace the infeed and outfeed tables 32 and 34 in the directions shown by arrows D and E, respectively, relative to the base structure 40.

The infeed surface $S_i$ defines an infeed plane F, while the outfeed surface $S_o$ defines an outfeed plane G. Conventionally, the reference plane C, infeed plane F, and outfeed plane G are substantially horizontal and parallel with each other. The outfeed table 34 is ideally adjusted such that the outfeed plane G is substantially coplanar with the reference plane C. An offset distance H between the infeed plane F and the reference plane C defines the depth of cut of the jointer 20.

Figure 2:
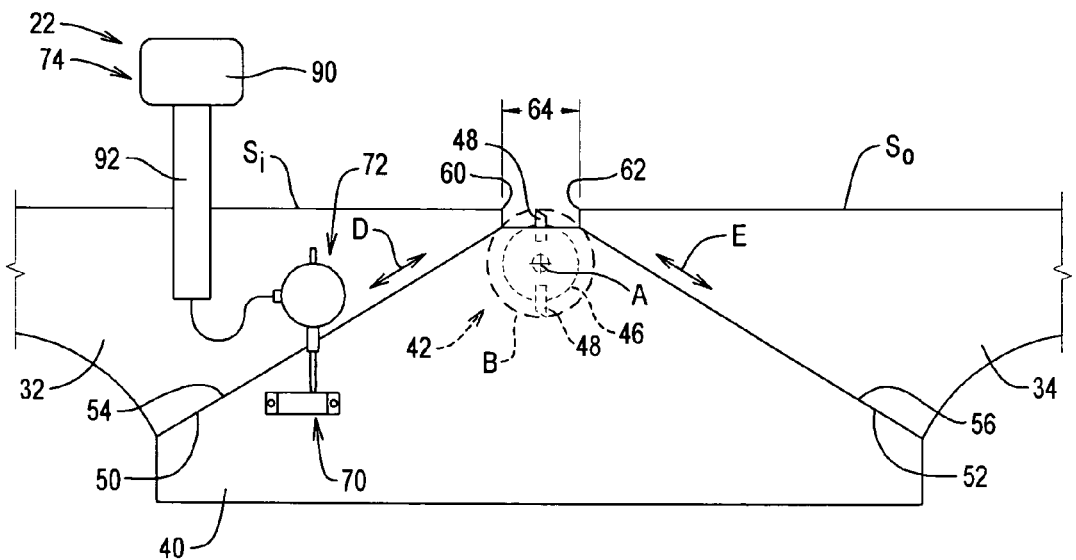
FIG. 2 is a rear elevation view of a portion of the jointer of FIG. 1 illustrating the major components of the first example depth of cut measuring system.
Figure 5:
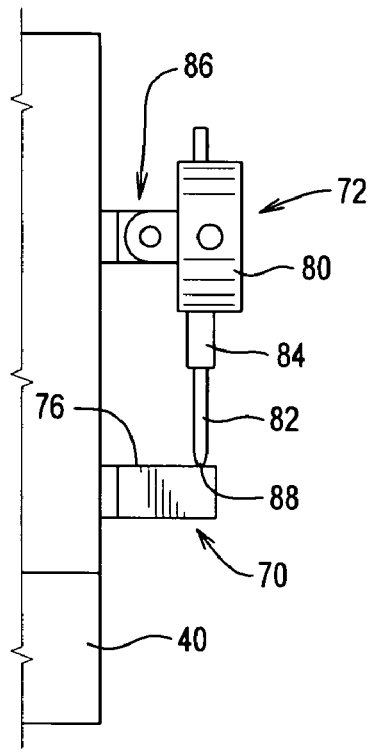
FIG. 5 is a side elevation view of a portion of the jointer of FIG. 1 illustrating the major components of the depth of cut measuring system of the present invention.

As perhaps best shown in FIG. 2, the depth of cut measurement system 22 comprises a stop member 70, a gauge assembly 72, and a display assembly 74. The stop member 70 defines a substantially planar stop surface 76 that in turn defines a stop plane 1. As shown in FIGS. 3 and 4, the stop member 70 is rigidly connected to the base structure 40 such that the stop plane I is substantially horizontal.

Figure 6:
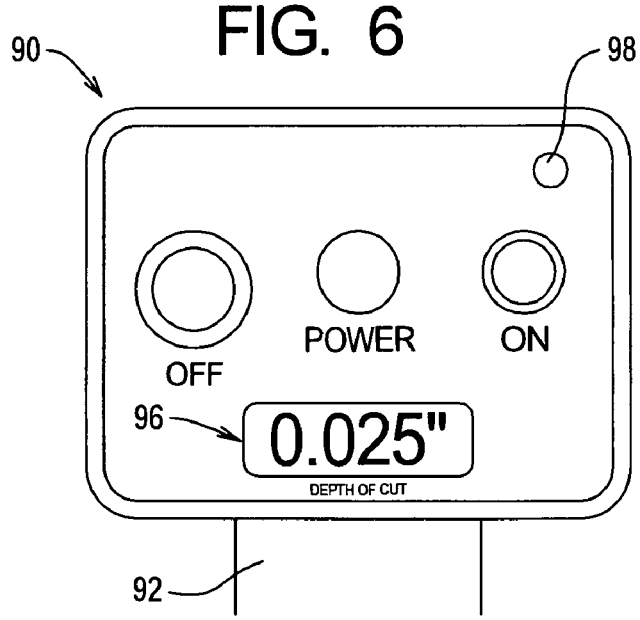
FIG. 6 is a front elevation view of a display portion of the depth of cut measuring system of the present invention.

The gauge assembly 72 comprises a gauge 80, a pin member 82, a pin support sleeve 84, and a mounting assembly 86 (FIG. 6). The gauge 80 supports the pin support sleeve 84, and the pin support sleeve 84 supports the pin member 82 for movement along a pin longitudinal axis J relative to the gauge 80. The mounting assembly 86 rigidly connects the gauge 80 to the infeed table 32. The example pin member 82 is an elongate cylindrical member but may take other forms depending upon a particular implementation of the principles of the present invention.

The locations of the gauge 80 relative to the infeed table 32 and the stop member 70 relative to the base member 40 are selected such that a tip 88 of the pin member 82 remains in contact with the stop surface 76 as the infeed table 32 is moved relative to the base member 40 to set the depth of cut. Is In particular, as shown in FIGS. 3 and 4, the infeed table 32 moves between a first position (FIG. 3) and a second position (FIG. 4). The first and second positions define a range of movement of the infeed table 32 relative to the base structure 40. When the infeed table 32 is in the first position, the infeed plane F is at least coplanar with the reference plane C and may be above the reference plane C. When the infeed table 32 is in the second position, the infeed plane F is below the reference plane C by the offset distance H. The infeed table 32 will typically be arranged somewhere between the first and second positions based on the desired depth of cut.

As the infeed table 32 moves between the first and second positions, the gauge 80 moves in the direction D with the infeed table 32, and the pin member 82 is displaced laterally a pin displacement distance K as shown in FIG. 4. However, because the pin member 82 moves relative to the gauge 80, the gauge 80 moves a gauge distance L relative to the pin member 82. The gauge distance L is equal to the offset distance H.

The gauge assembly 72 generates a depth of cut measurement signal based on displacement of the gauge 80 relative to the pin member 82. The depth of cut signal is a digital or analog signal corresponding to the gauge distance L.

The display assembly 74 comprises a control panel 90 (FIG. 6), a support member 92, and a cable 94 that carries the depth of cut signal from the gauge assembly 72 to the control panel 90. As perhaps best shown in FIG. 1, the support member 92 supports the control panel 90 for view by the operator of the jointer 20. The control panel 90 comprises a display device 96 that generates, based on the depth of cut signal, an image representing the depth of cut. The example image displayed by the display device 96 comprises alphanumeric characters representing the depth of cut in thousandths of an inch (0.025"), but other displays (e.g. dial) and measurement systems (e.g., metric) may be used.

As described above, the reference plane C is determined by the dimensions of each particular blade assembly 42. To calibrate the measurement system 22, the infeed table 32 is moved until the infeed plane F is parallel to the reference plane C. At this point, a calibrate button 98 on the control panel 90 may be pressed to zero the output of the display device 96. The output of the display device 96 device thus corresponds to distance indicated by the depth of cut signal from the location of the pin member 82 on the stop surface 76 at the time the calibrate button 98 is activated.

Figure 7:
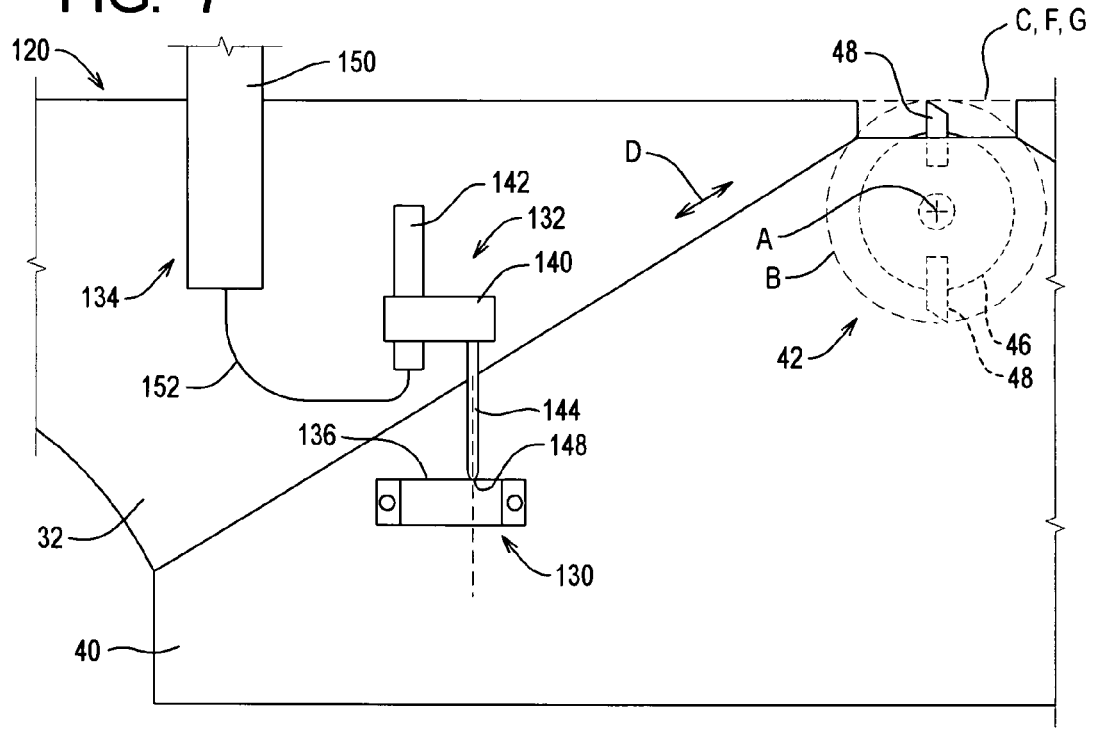
FIG. 7 is a rear elevation view illustrating a second example depth of cut measuring system in a first configuration.
Figure 8:
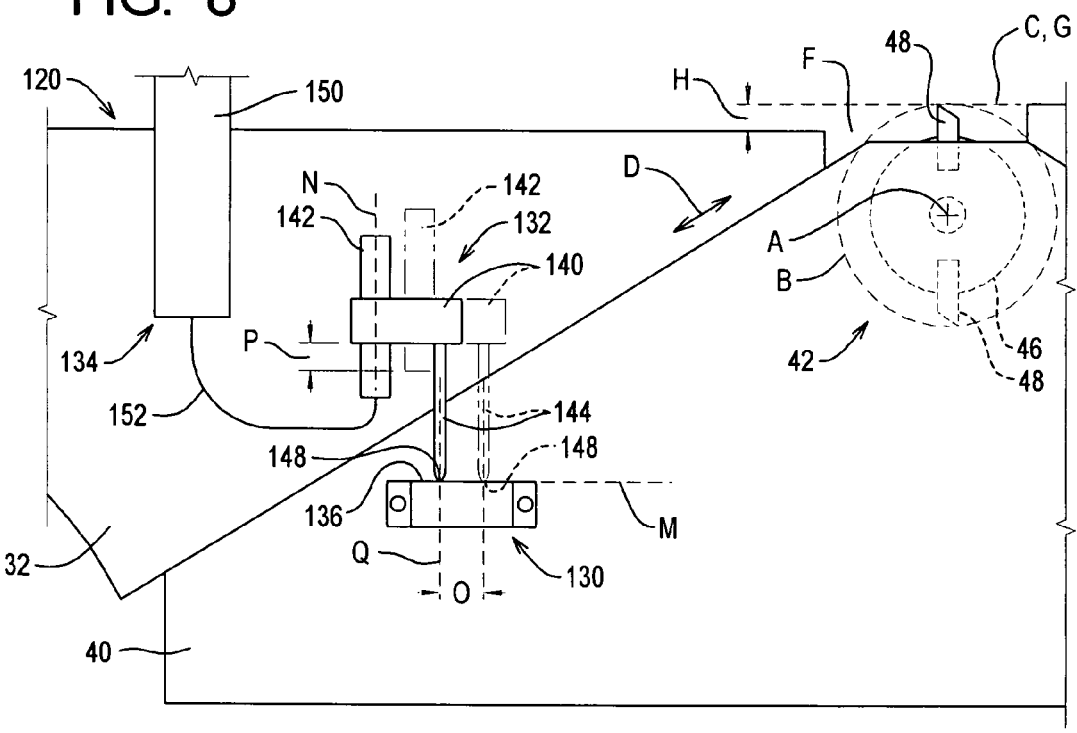
FIG. 8 is a rear elevation view illustrating the second example depth of cut measuring system in a second configuration.

Referring now to FIGS. 7 and 8 of the drawing, depicted therein is another example depth of cut measurement system 120 constructed in accordance with, and embodying, the principles of the present invention. The measurement system 120 is also adapted to be used with either a dovetail table jointer such as the example jointer 20 as shown or with other types of jointers such as parallelogram jointers.

As shown in FIGS. 7 and 8, the depth of cut measurement system 120 comprises a stop member 130, a gauge assembly 132, and a display assembly 134. The stop member 130 defines a substantially planar stop surface 136 that in turn defines a stop plane M. As shown in FIGS. 7 and 8, the stop member 130 is rigidly connected to the base structure 40 such that the stop plane M is substantially horizontal.

The gauge assembly 132 comprises a gauge 140, a rail 142, a pin member 144, and a mounting assembly (not shown in FIGS. 7 and 8). The mounting assembly rigidly connects the rail 142 to the infeed table 32. The rail 142 in turn supports the gauge 140 for movement along a fixed axis N relative to the infeed table 32. The pin member 144 is rigidly connected to the gauge 140.

The locations of the rail 142 relative to the infeed table 32 and the stop member 130 relative to the base member 40 are selected such that a tip 148 of the pin member 144 remains in contact with the stop surface 136 as the infeed table 32 is moved relative to the base member 40 to set the depth of cut.

In particular, as shown in FIGS. 7 and 8, the infeed table 32 moves between a first position (FIG. 7) and a second position (FIG. 8). The first and second positions define a range of movement of the infeed table 32 relative to the base structure 40. When the infeed table 32 is in the first position, the infeed plane F is at least coplanar with the reference plane C and may be above the reference plane C. When the infeed table 32 is in the second position, the infeed plane F is below the reference plane C by the offset distance H. The infeed table 32 will typically be arranged somewhere between the first and second positions based on the desired depth of cut.

As the infeed table 32 moves between the first and second positions, the gauge 140 moves in the direction D with the infeed table 32. The pin member 144 is displaced laterally a pin displacement distance O as shown in FIG. 8. In addition, the gauge 140 moves a gauge distance P along a longitudinal axis Q of the rail 142 relative to the rail member 142. The gauge distance P is equal to the offset distance H.

The gauge assembly 132 generates a depth of cut signal based on displacement of the gauge 140 relative to the rail member 142. The depth of cut signal is a digital or analog signal corresponding to the gauge distance P. The gauge 140 and rail member 142 may take the form of what is commonly referred to as a glass scale. A glass scale is a precision instrument for measuring relative displacement between the gauge 140 and the rail member 142.

As with the display assembly 74 described above, the display assembly 134 comprises a control panel (not shown), a support member 150, and a cable 152 that carries the depth of cut signal from the gauge assembly 132 to the control panel. The support member 150 supports the control panel so that the user may see a display image representing the depth of cut, where the display image is generated based on the depth of cut signal.

As described above, the reference plane C is determined by the dimensions of each particular blade assembly 42. To calibrate the measurement system 120, the infeed table 32 is moved until the infeed plane F is parallel to the reference plane C. At this point, a calibrate button (not shown) on the control panel may be pressed to zero the output of the display device. The output of the display device thus corresponds to the distance indicated by the depth of cut signal from the location of the pin member 144 on the stop surface 136 at the time the calibrate button is activated. Alternatively, an effective length of the pin member 144 may be shortened or lengthened such that the display image is zero when the infeed plane F is parallel to the reference plane C.

Figure 9:
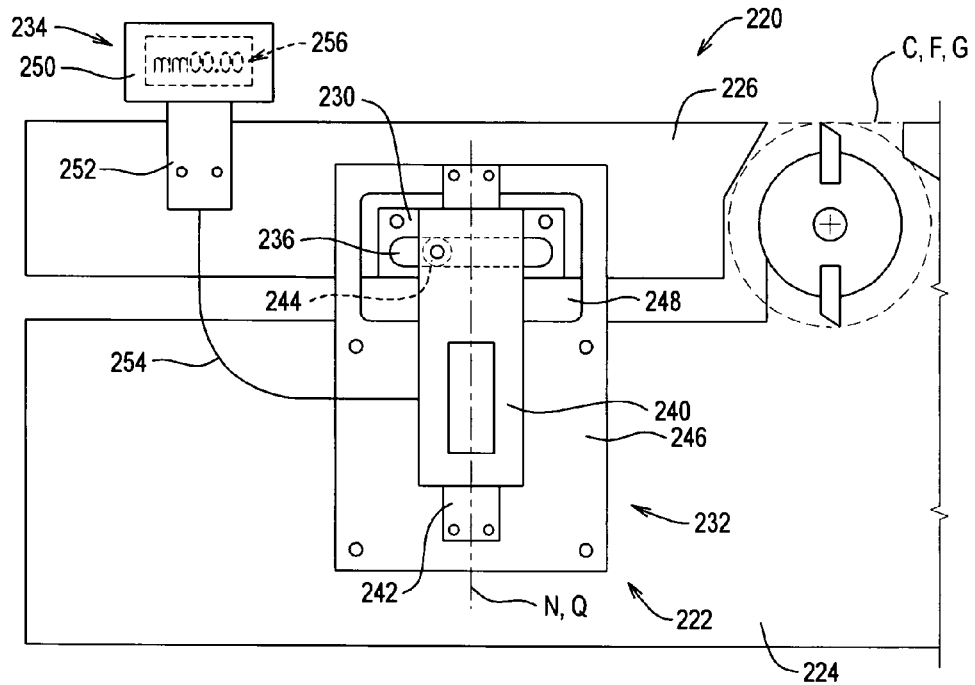
FIG. 9 is a rear elevation view illustrating a third example depth of cut measuring system in a first configuration.
Figure 10:
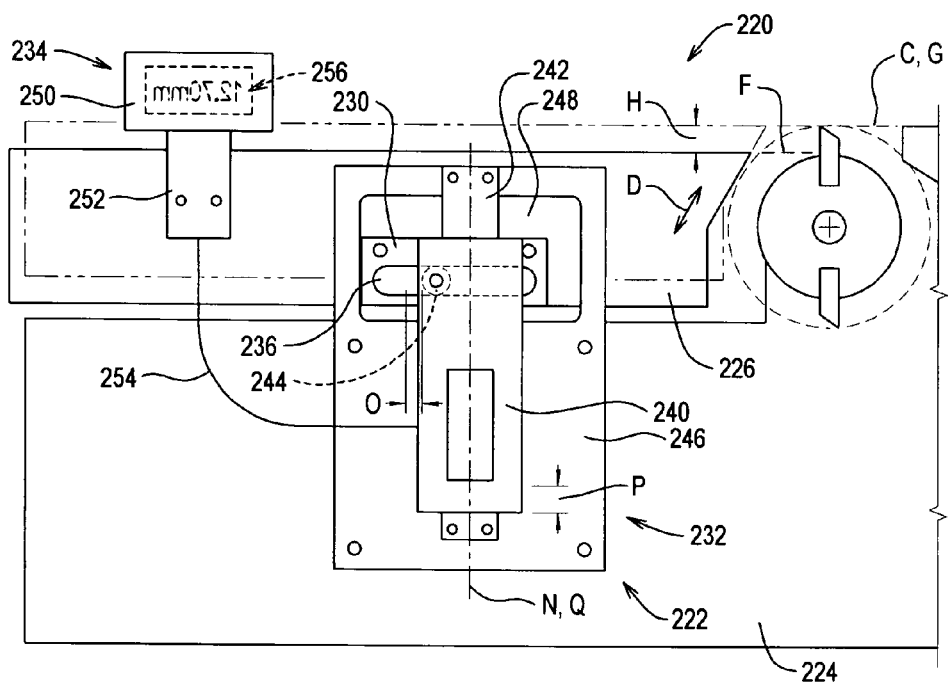
FIG. 10 is a rear elevation view illustrating the third example depth of cut measuring system in a second configuration.

Referring now to FIGS. 9 and 10 of the drawing, depicted at depicted therein is another example jointer 220 using another example depth of cut measurement system 222 constructed in accordance with, and embodying, the principles of the present invention.

The measurement system 222 is also adapted to be used with any type of jointer system, but the jointer 220 is a parallelogram table jointer. Parallelogram table jointers are conventional, and the example jointer 220 will be described herein only to the extent necessary for a complete understanding of the present invention. In addition, reference planes and paths defined by the jointer 220 will be similar to those defined by jointer system 20 described above, and the same reference characters will be used below with reference to the jointer 220.

FIGS. 9 and 10 illustrate that the example jointer 220 comprises a base structure 224 and an infeed table portion 226. As is conventional, the infeed table portion 226 is movable relative to the base structure 224 to allow adjustment of depth of cut.

As shown in FIGS. 9 and 10, the depth of cut measurement system 222 comprises a stop member 230, a gauge assembly 232, and a display assembly 234. The stop member 230 defines a stop opening 236 that in turn defines a stop plane M. As shown in FIGS. 9 and 10, the stop member 230 is rigidly connected to the infeed table 226 such that the stop plane M is substantially parallel to the infeed plane F defined by the infeed table 226.

The gauge assembly 232 comprises a gauge 240, a rail 242, a pin member 244, and a mounting plate 246. The mounting plate 246 rigidly connects the rail 242 to the base structure 224. The rail 242 in turn supports the gauge 240 for movement along a fixed axis N relative to the base structure 224. The pin member 244 rigidly extends from the gauge 240 through a mounting opening 248 formed in the mounting plate 246 and the stop opening 236.

The locations of the rail 242 relative to the base structure 224 and the stop member 230 relative to the infeed table 226 are selected such that the pin member 244 remains in contact with the stop member 230 as the infeed table 226 is moved relative to the base member 224 to set the depth of cut. The infeed table 226 moves in two axes relative to the base member 224. The stop opening 236 is elongate to allow the pin member 244 to move horizontally relative to the infeed table 226, while the rail 242 allows vertical movement of the pin member 244 relative to the infeed table 226.

In particular, as shown in FIGS. 9 and 10, the infeed table 226 moves between a first position (FIG. 9) and a second position (FIG. 10). The first and second positions define a range of movement of the infeed table 226 relative to the base structure 224. When the infeed table 226 is in the first position, the infeed plane F is at least coplanar with the reference plane C and may be above the reference plane C. When the infeed table 226 is in the second position, the infeed plane F is below the reference plane C by the offset distance H. The infeed table 226 will typically be arranged somewhere between the first and second positions based on the desired depth of cut.

As the infeed table 226 moves between the first and second positions, the stop member 230 moves in the direction D with the infeed table 226. The stop member 230 engages and displaces the pin member 244 laterally a pin displacement distance O as shown in FIG. 10. In addition, the gauge 240 moves vertically relative to the rail member 242 a gauge distance P along a longitudinal axis Q of the rail member 242. The gauge distance P is equal to the offset distance H.

The gauge assembly 232 generates a depth of cut signal based on displacement of the gauge 240 relative to the rail member 242. The depth of cut signal is a digital or analog signal corresponding to the gauge distance P. The gauge 240 and rail member 242 may take the form of what is commonly referred to as a glass scale. A glass scale is a precision instrument for measuring relative displacement between the gauge 240 and the rail member 242.

As with the display assemblies 74 and 134 described above, the display assembly 234 comprises a control panel 250, a support member 252, and a cable 254 that carries the depth of cut signal from the gauge assembly 232 to the control panel 250. The support member 252 supports the control panel 250 so that the user may see a display image 256 representing the depth of cut, where the display image is generated based on the depth of cut signal. FIGS. 9 and 10 are rear elevation views. Because the display image 256 faces the front, the display image 256 is depicted in reverse in FIGS. 9 and 10.

As described above, the reference plane C is determined by the dimensions of each particular blade assembly 42. To calibrate the measurement system 222, the infeed table 226 is moved until the infeed plane F is parallel to the reference plane C. At this point, a calibrate button (not shown) on the control panel may be pressed to zero the output of the display device. The output of the display device thus corresponds to the distance indicated by the depth of cut signal from the location of the pin member 244 in the stop opening 236 at the time the calibrate button is activated. Alternatively, the vertical location of the stop member 230 relative to the infeed table 226 may be altered; similarly, the vertical location of the rail 242 may be altered. In either case, the display image should indicate zero when the infeed plane F is parallel to the reference plane C.

Given the foregoing, it should be apparent that the present invention may be embodied in forms other than those described above. The scope of the present invention should thus be determined based on the claims appended hereto and not the foregoing detailed description of the invention.

I claim:

1. A jointer system comprising:
   a blade assembly;
   a base for supporting the blade assembly for rotation about a blade axis, where the blade assembly defines a reference plane;
   an infeed table defining an infeed surface defining an infeed plane, where the infeed table is supported by the base for linear movement in an infeed direction relative to the base to alter an offset distance between the infeed plane and the reference plane;

a measurement system comprising
a stop member, where the stop member defines a stop plane,
a gauge assembly comprising
  a gauge and
  a pin member supported by the infeed table such that the pin member is in contact with the stop member, and the pin member is capable of linear movement relative to the infeed table, and
a display assembly; whereby as the infeed table moves relative to the base, the pin member linearly moves a gauge distance relative to the infeed table, where the gauge distance is related to the offset distance; as the pin member moves relative to the infeed table, the gauge assembly generates a measurement signal indicative of the gauge distance; and the display assembly generates a display image based on the measurement signal; wherein the gauge is rigidly connected to the in member; the gauge is movably supported by the one of the infeed table and the base; and the gauge assembly generates the measurement signal to indicate movement of the gauge relative to the other of the infeed table and the base.

2. A jointer system as recited in claim 1, in which the gauge assembly further comprises a rail, wherein:
  the rail is supported by one of the infeed table and the base;
  the pin member is supported such that the pin member moves along the rail as the infeed table moves relative to the base.

3. A jointer system as recited in claim 2, in which the gauge assembly generates the measurement signal based on movement of the pin member relative to the rail.

4. A jointer system as recited in claim 2, in which the rail supports the pin member such that movement of the infeed table causes the pin member to move relative a longitudinal axis of the rail.

5. A jointer system as recited in claim 1, in which the gauge is a glass scale.

6. A jointer system as recited in claim 1, in which the gauge assembly further comprises a rail defining a longitudinal axis; wherein
  the stop member is rigidly connected to the infeed table;
  the rail is rigidly connected to the base;
  the pin member contacts the stop member such that movement of the infeed table relative to the base causes the pin member to move along the longitudinal axis of the rail.

* * * * *